United States Patent
Ulmer et al.

(10) Patent No.: US 10,458,784 B2
(45) Date of Patent: Oct. 29, 2019

(54) METHOD AND APPARATUS FOR DETERMINING AT LEAST ONE OF DIMENSIONAL OR GEOMETRIC CHARACTERISTICS OF A MEASUREMENT OBJECT

(71) Applicant: CARL ZEISS INDUSTRIELLE MESSTECHNIK GMBH, Oberkochen (DE)

(72) Inventors: Franz-Georg Ulmer, Brannenburg (DE); Christian Hoerr, Flintsbach (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/999,119

(22) Filed: Aug. 16, 2018

(65) Prior Publication Data
US 2019/0056218 A1    Feb. 21, 2019

(30) Foreign Application Priority Data
Aug. 17, 2017 (DE) .................. 10 2017 118 767

(51) Int. Cl.
G01B 11/25 (2006.01)
G01B 11/00 (2006.01)

(52) U.S. Cl.
CPC ........ G01B 11/2504 (2013.01); G01B 11/005 (2013.01); G01B 11/2513 (2013.01); G01B 11/2518 (2013.01)

(58) Field of Classification Search
CPC ............ G01B 11/2504; G01B 11/2518; G01B 11/005; G01B 11/25; G01B 11/2527;
(Continued)

(56) References Cited

U.S. PATENT DOCUMENTS 6,587,183 B1 * 7/2003 Uomori .................. G01B 11/25
348/E5.058
6,590,669 B1 7/2003 Wagner
(Continued)

FOREIGN PATENT DOCUMENTS

DE   102010007396 A1   8/2011
DE   102015203396 A1   8/2016
(Continued)

OTHER PUBLICATIONS

Steffen Herbort et al.; 3D range scan enhancement using image-based methods; ISPRS Journal of Photogrammetry and Remote Sensing 84; 2013; pp. 69-84.
(Continued)

*Primary Examiner* — Sang H Nguyen
(74) *Attorney, Agent, or Firm* — Harness, Dickey & Pierce, P.L.C.

(57) ABSTRACT

3D coordinates at first selected measurement points of a measurement object are determined using a first measurement arrangement. Surface normals at second selected measurement points of the measurement object are determined using a second measurement arrangement. Using the 3D coordinates and the surface normals, at least one of dimensional or geometric characteristics of the measurement object are determined. The second measurement arrangement includes a number of light sources and a first camera which is directed to the measurement object. A calibration data set represents individual direction dependent radiation patterns of the light sources. The surface normals are determined using the calibration data set and the 3D coordinates at the first selected measurement points.

17 Claims, 3 Drawing Sheets

(58) Field of Classification Search
CPC ........... G01B 11/4738; G01N 21/4738; G01N 21/8806; G01N 21/8851; G01N 2021/8829; H04N 13/0022; H04N 13/0271; H04N 13/0203; H04N 7/18; H04N 5/2256

See application file for complete search history.

(56) References Cited

U.S. PATENT DOCUMENTS

| | | | |
|---|---|---|---|
| 7,532,333 B2* | 5/2009 | Haeusler | G01B 11/2545 356/601 |
| 7,876,455 B2* | 1/2011 | Kawasaki | G01B 11/2513 356/602 |
| 2006/0001543 A1* | 1/2006 | Raskar | G01S 5/16 340/572.1 |
| 2008/0137101 A1 | 6/2008 | Spence et al. | |
| 2008/0232679 A1 | 9/2008 | Hahn et al. | |
| 2009/0297020 A1* | 12/2009 | Beardsley | G06T 7/521 382/154 |
| 2012/0320157 A1 | 12/2012 | Junuzovic et al. | |
| 2012/0327295 A1* | 12/2012 | Beck | G01B 11/245 348/370 |
| 2013/0135450 A1* | 5/2013 | Pallone | A61B 5/0091 348/50 |
| 2014/0028801 A1* | 1/2014 | Tin | G01N 21/55 348/46 |
| 2014/0168379 A1* | 6/2014 | Heidemann | G01B 11/2513 348/47 |
| 2015/0077764 A1* | 3/2015 | Braker | G01B 11/2518 356/620 |
| 2015/0253428 A1* | 9/2015 | Holz | G01S 17/42 356/5.01 |
| 2016/0156899 A1* | 6/2016 | Higo | G01B 11/2545 348/48 |
| 2016/0261844 A1 | 9/2016 | Kadambi et al. | |

FOREIGN PATENT DOCUMENTS

| | | |
|---|---|---|
| KR | 100235253 B1 | 12/1999 |
| KR | 20030034274 A | 5/2003 |
| WO | WO-20160127173 A1 | 8/2016 |

OTHER PUBLICATIONS

Diego Nehab et al.; Efficiently Combining Positions and Normals for Precise 3D Geometry; 2005; 8 pp.

Robert J. Woodham; Photometric method for determining surface orientation from multiple images; 1980; 6 pp.

Mohit Gupta et al.; A Practical Approach to 3D Scanning in the Presence of Interreflections, Subsurface Scattering and Defocus; 2013; 24 pp.

Wuyuan Xie et al.; Photometric Stereo with Near Point Lighting: A Solution by Mesh Deformation; 9 pp.

Thomas Papadhimitri et al., Uncalibrated Near-Light Photometric Stereo; 2014; 12 pp.

Jahanzeb Ahmad et al.; Improving photometric stereo through per-pixel light vector calculation; 2013; 12 pp.

* cited by examiner

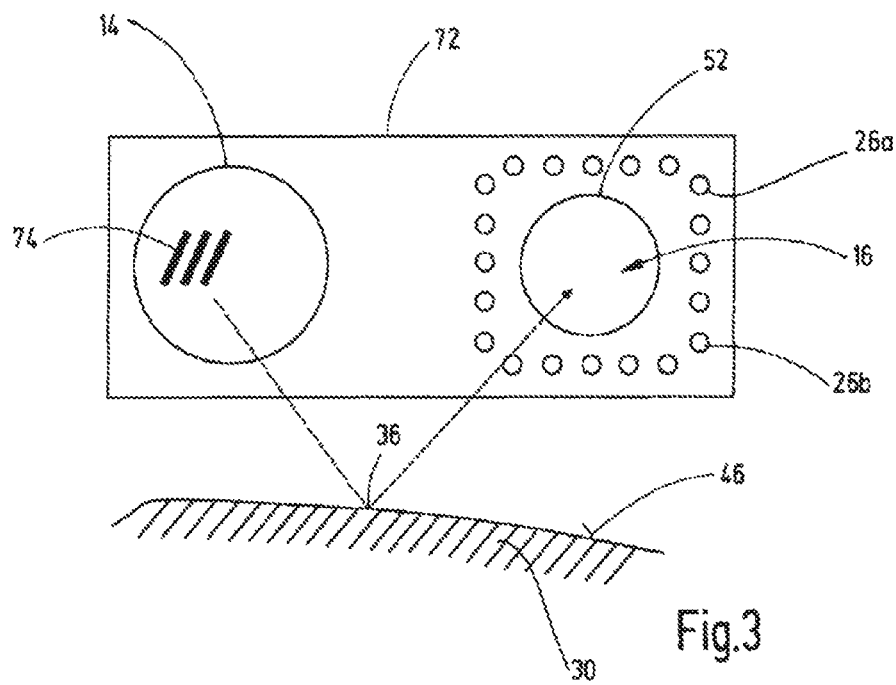
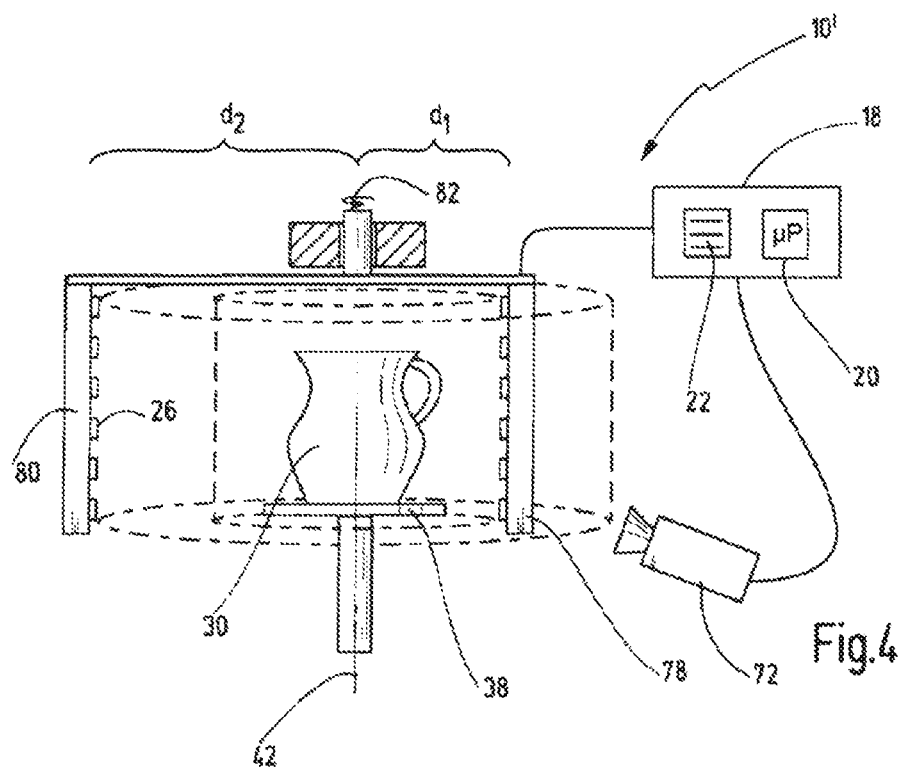

METHOD AND APPARATUS FOR DETERMINING AT LEAST ONE OF DIMENSIONAL OR GEOMETRIC CHARACTERISTICS OF A MEASUREMENT OBJECT

CROSS-REFERENCES TO RELATED APPLICATIONS

This application claims priority from German patent application 10 2017 118 767.7 filed on Aug. 17, 2018. The entire content of this priority application is incorporated herein by reference.

BACKGROUND OF THE INVENTION

The present invention relates to method and an apparatus for determining dimensional and/or geometric characteristics of a measurement object.

Determining dimensional and/or geometric characteristics of an object is a typical task in industrial metrology. By way of example, geometric and/or dimensional characteristics of an individual workpiece are determined for quality control in industrial production processes in order to check whether the workpiece observes specified tolerances. In the development and design of new products, it is also frequently desirable to measure the individual characteristics of a prototype or of a counterpart that cooperates with the workpiece to be designed. The dimensional and/or geometric characteristics can include distances between individual features of the workpiece, such as the distance between two edges or the diameter of a hole, and also the complex geometric shape of the workpiece. Increasingly there has been a desire to obtain what is known as a 3D scan of a workpiece or a workpiece part. The 3D scan provides a plurality of spatial coordinates (3D coordinates), which define the position of numerous measurement points on the workpiece relative to a reference coordinate system and which therefore describe the complex shape of the workpiece. The dimensional and/or geometric characteristics can be determined on the basis of the measured spatial coordinates.

There are various methods for obtaining a 3D scan of a workpiece or measurement object. By way of example, a probe element can be used to physically touch the desired measurement points, wherein the spatial coordinates of the measurement points are determined from the respective position of the calibrated probe element relative to the reference coordinate system. In addition, there are various contactless methods for determining the position of measurement points relative to a reference coordinate system. Some methods are based on triangulation, in which the measurement object is recorded with one or more cameras and the evaluation of the camera images is based on trigonometric relationships. In some of these methods, the measurement object is illuminated with a defined pattern, for example in the case of what is known as fringe projection method. Each method has specific advantages and disadvantages with respect to the apparatus involved and with respect to the size of the measurement volume, the attainable measurement accuracy, measurement velocity, and others. For example, fringe projection methods are sensitive with respect to image noise and are not suitable for high-gloss surfaces.

A publication by R. J. Woodham with the title "*Photometric Method for Determining Surface Orientation from Multiple Images*", published in Optical Engineering, 19(1), 1980, describes a method with which the respective local orientation of the measurement object surface can be determined at a plurality of measurement points by illuminating the surface successively from different directions. Using a stationary camera, images of the respectively illuminated surface are recorded and what are known as the surface normals are determined therefrom. A surface normal is a vector which is perpendicular to the surface and consequently represents the orientation of the surface at that location. The method by Woodham is known by the term photometric stereo and is based on the assumption of point-like light sources, situated at infinity, with in each case the same light intensity. This assumption cannot be met in practice, which results in measurement errors when determining the surface normals.

A publication by Diego Nehab et al. with the title "*Efficiently Combining Positions and Normals for Precise 3D Geometry*", ACM Transactions on Graphics (Proc. of ACM SIGGRAPH 2005) proposes a computational combination of the measurement results from a fringe projection method and from a photometric stereo method. The surface normals of the measurement object can be calculated using the 3D coordinates from the fringe projection method. Vice versa, it is possible to reconstruct the object surface on the basis of the surface normals from photometric stereo, and 3D coordinates therefrom. Fringe projection methods result in rather short-wave/high-frequency measurement errors (with respect to the extent of the surface) in the form of apparently random, high-frequency noise. By contrast, measurement errors in the case of photometric stereo are rather longwave. Nehab et al. propose to combine by calculation the "good" measurement results of the fringe projection method in the long-wave range with the "good" measurement results of the photometric stereo method in the short-wave/high-frequency range. The object surface is alleged to be reconstructed in a more detailed and more accurate manner in this way than by each individual method.

Moreover, many other proposals exist for increasing the accuracy of a metrological reconstruction of an object surface. For example, Mohit Gupta et al. propose in a publication with the title "*A Practical Approach to 3D Scanning in the Presence of Interreflections, Subsurface Scattering and Defocus*", published in the International Journal of Computer Vision 102.1 to 3 (2013), the use of specific projection patterns for a fringe projection method to better control multiple reflections, scattering at depth (subsurface scattering) and focusing errors. Two further publications discuss improvements in the use of spatially near point light sources for photometric stereo, namely Woyuan Xie et al. "*Photometric Stereo with Nearpoint Lighting: A Solution by Mesh Deformation*", published in IEEE Conference of Computer Vision and Pattern Recognition (CVPR) and Thoma Papadhimitri et al. "*Uncalibrated Near-Light Photometric Stereo*", published in Proceedings of the British Machine Vision Conference 2014.

DE 10 2010 007 396 A1 discloses a method and an apparatus for optically inspecting a measurement object having an at least partially reflective surface in order to determine the local scattering characteristics of the object surface. In this method, the object surface is successively illuminated with light sources at different positions, similar to the photometric stereo method. A camera takes a series of images with the different illuminations. Subsequently, an individual light origin region is determined for at least one camera pixel. The light origin region represents the spatial distribution of the individual light contributions produced by the individual light sources over the surface of the measurement object on the at least one pixel. Next, the scattering characteristics of the surface point recorded by the camera pixel is determined on the basis of the individual light origin region. 3D coordinate measurement and determination of dimensional and/or geometric characteristics of the measurement object which is based thereon is not envisaged in this method.

SUMMARY OF THE INVENTION

Against this background, it is an object of the present invention to provide an alternative method and an alternative apparatus that allow for high measurement accuracy in the determination of dimensional and/or geometric characteristics of a measurement object. It is another object of the present invention to provide a method and an arrangement that allow to determine dimensional and/or geometric characteristics, such as shape characteristics, in an efficient manner.

In accordance with a first aspect of the invention, there is provided a method for determining at least one of dimensional or geometric characteristics of a measurement object, comprising the steps of: providing a first measurement arrangement for determining 3D coordinates at first selected measurement points of the measurement object, providing a second measurement arrangement for determining surface normals at second selected measurement points of the measurement object, wherein the second measurement arrangement includes a number of light sources and a first camera which is directed to the measurement object, providing a calibration data set representing direction dependent individual radiation patterns of the light sources, determining 3D coordinates at the first selected measurement points using the first measurement arrangement, the 3D coordinates defining first measurement results, determining surface normals at the second selected measurement points using the second measurement arrangement and using the calibration data set and the first measurement results, the surface normals thus determined defining second measurement results, and determining the at least one of dimensional or geometric characteristics of the measurement object using the first and the second measurement results.

In accordance with a further aspect of the invention, there is provided an apparatus for determining at least one of dimensional or geometric characteristics of a measurement object, comprising a first measurement arrangement for determining 3D coordinates at first selected measurement points of the measurement object, comprising a second measurement arrangement for determining surface normals at second selected measurement points of the measurement object, wherein the second measurement arrangement includes a number of light sources and a first camera which is directed to the measurement object, and comprising an evaluation and control unit comprising a calibration data set that represents individual direction dependent radiation patterns of the light sources and configured for determining the 3D coordinates at the first selected measurement points using the first measurement arrangement, the 3D coordinates defining first measurement results, for determining the surface normals at the second selected measurement points using the second measurement arrangement and using the calibration data set and the first measurement results, the surface normals thus determined defining second measurement results, for determining the at least one of dimensional or geometric characteristics of the measurement object using the first and second measurement results.

There is also provided a computer program product comprising program code stored on a non-transitory storage medium, the program code configured to execute a method for determining at least one of dimensional or geometric characteristics of a measurement object using a first measurement arrangement for determining 3D coordinates at first selected measurement points of the measurement object and using a second measurement arrangement for determining surface normals at second selected measurement points of the measurement object, wherein the second measurement arrangement includes a number of light sources and a first camera which is directed to the measurement object, the method comprising the steps of: providing a calibration data set representing individual radiation patterns of the light sources, determining 3D coordinates at the first selected measurement points using the first measurement arrangement, the 3D coordinates defining first measurement results, determining surface normals at the second selected measurement points using the second measurement arrangement and using the calibration data set and the first measurement results, the surface normals thus determined defining second measurement results, and determining the at least one of dimensional or geometric characteristics of the measurement object using the first and the second measurement results.

The novel method and apparatus are based on the idea of using the 3D coordinates of the first measurement results already in the step of determining the surface normals in order to avoid, from the beginning, conceptional measurement errors in classical photometric stereo. In contrast to Nehab et al., the second measurement results are thus not determined entirely separately from the first measurement results and are subsequently, i.e. after the determination of the surface normals, combined with the first measurement results. Rather, information obtained by way of the first measurement results with respect to the individual measurement object are already incorporated in the determination of the surface normals from the outset.

In addition, the novel method and the novel apparatus use a calibration data set that represents the individual direction-dependent radiation patterns of the light sources in the second measurement arrangement. This calibration data set provides a priori knowledge that can advantageously be used for the determination of the surface normals in order to avoid conceptional measurement errors in photometric stereo from the very beginning. Consequently, the second measurement arrangement provides second measurement results with a high measurement accuracy. In particular, this reduces from the outset the long-wave measurement errors that Nehab et al. only correct by a subsequent combination with the 3D coordinates from the first measurement arrangement.

The higher accuracy of the second measurement arrangement advantageously translates to the measurement accuracy in the determination of the dimensional and/or geometric characteristics. The more accurate second measurement results can advantageously be used to correct measurement errors of the first measurement arrangement over the entire frequency range and thus reduce them even further overall. In this way, the novel method and the novel apparatus make possible a higher detail accuracy over the entire error frequency range due to an efficient use of the first measurement results. The abovementioned object is completely achieved.

In a preferred refinement of the invention, the first measurement results are corrected using the second measurement results in order to obtain third measurement results, wherein the dimensional and/or geometric characteristics of the measurement object are determined using the second and/or third measurement results.

Alternatively, the characteristics of the measurement object could be determined alone on the basis of the second measurement results which already allows for a high measurement accuracy in the entire frequency range due to the inclusion of the a priori knowledge from the first measurement results. In the preferred refinement, the first measurement results, i.e. the 3D coordinates at the first selected measurement points, are verified using the now available knowledge from the second measurement results and corrected, if necessary, in order to achieve a measurement accuracy which is further increased. In contrast to the method by Nehab et al., the first measurement results can be corrected over the entire frequency range because, in particular, the measurement errors of the second measurement arrangement in the long-wave range are reduced.

In principle, the method by Nehab et al. can be used for correction purposes. In some exemplary embodiments, 3D coordinates are determined for the second selected measurement points on the basis of the second measurement results, and the 3D coordinates from the first measurement results and the 3D coordinates from the second measurement results are combined, for example using the least squares error method or another matching algorithm.

In some exemplary embodiments, the first selected measurement points and the second selected measurement points can differ from one another. In other exemplary embodiments, the first selected measurement points and the second selected measurement points can in each case be identical measurement points on the measurement object. Furthermore, a mixture is possible, such that for some selected measurement points both first measurement results and second measurement results are available, while for other selected measurement points, only a first measurement result or a second measurement result is available. Regardless thereof, the dimensional and/or geometric characteristics of the measurement object can be determined with a very high measurement accuracy and great detail and very efficiently in the preferred refinement.

In a further refinement, continuous regions of the measurement object are determined using the second measurement results, and the first measurement results are corrected only in the continuous regions using the second measurement results.

Determining a continuous region can be done simply using the second measurement results by defining a tolerance interval for the alignment of the normal vectors of a continuous region. Adjacent measurement points, the surface normals of which are within the tolerance interval, are ascribed to the continuous region. Measurement points, the surface normals of which are outside the tolerance interval, are no longer ascribed to the continuous region. In this refinement, only second measurement results from surface regions which largely have similar surface normals are used for the correction of the first measurement results. The refinement allows for a high measurement accuracy at edges, corners and other abrupt object contours at which a continuity condition assumed for post processing is not fulfilled. Limiting the corrections of the first measurement values to continuous surface regions prevents non-continuous regions, such as workpiece edges, to be "rounded" during post processing.

In a further refinement, the first measurement results are interpolated and/or extrapolated using the second measurement results and the dimensional and/or geometric characteristics of the measurement object are determined using the interpolated and/or extrapolated measurement results. In some preferred exemplary embodiments, this refinement includes a subpixel-accurate reconstruction of the measurement surface using the first and second measurement results.

The first and the second measurement arrangement each operate at a resolution that is determined by the method used and the components used. By interpolation and/or extrapolation of the measurement results obtained with the first measurement arrangement, it is possible to computationally attain a higher resolution. In addition, surface regions of the measurement object at which the first measurement arrangement provides no evaluable 3D coordinates (for example because of local underexposure or overexposure) can be "filled" by interpolation and/or extrapolation. This refinement here has the advantage that, owing to the second measurement results, additional support points are available which can be used to verify and optimize the computational interpolation and/or extrapolation. The refinement advantageously contributes to a high measurement resolution and in particular to data completeness.

In a further refinement, using the first measurement values and the calibration data set, respective individual light vector between a light source and one of the second measurement points is determined and the second measurement results are determined using the respective individual light vectors. Moreover, using the first measurement values and the calibration data set, a bidirectional reflectance distribution function (BRDF) is preferably determined at the second selected measurement points, and the second measurement results are determined using the respective BRDF at the second selected measurement points.

As already indicated further above, it is possible to increase measurement accuracy of the second measurement values over the entire frequency range with this refinement, because systematic measurement errors resulting from purely theoretical, simplifying assumptions are prevented or at least noticeably reduced. The refinement therefore contributes particularly efficiently to an overall increase in measurement accuracy.

In a further refinement, the second measurement arrangement has a first and at least one second light source, wherein the respective individual light vectors are determined separately for the first and for the at least one second light source, and wherein the individual direction-dependent radiation patterns of the first and of the at least one second light source are normalized using the individual light vectors.

With this refinement, the measurement accuracy of the novel method and of the novel apparatus are further increased. It is generally possible for the second measurement arrangement to have only one light source which is positioned at different positions relative to the measurement object in the course of the measurement. This can be done automatically in some exemplary embodiments, one of which will be described further below. In other exemplary embodiments, the second measurement arrangement in contrast has a plurality of light sources which are positioned at different positions relative to the measurement object. In practice, the individual radiation patterns of the different light sources can vary, in particular as regards the light intensity and/or the focusing of the light cone. With the present refinement, the radiation patterns of the different light sources are normalized or standardized by calculation. Hereby, measurement errors due to differences in the radiation patterns of the light sources are eliminated or at least reduced.

In a further refinement, the second measurement arrangement has a plurality of differently colored light sources.

This refinement allows for a faster measurement process by using differently colored light sources to illuminate the measurement object at the same time. The evaluation and control unit can separate the light components of the individual light sources from one another in the image of the measurement object on the basis of the different light colors (light wavelengths). The method of the present refinement consequently requires fewer image recordings while the measurement accuracy remains the same.

In a further refinement, a first and a second image of a calibration object are taken with the camera, wherein the calibration object in the first image is illuminated with the differently colored light sources, and wherein the calibration object in the second image is illuminated with a white light source.

This refinement is advantageous for normalizing the differently colored light sources on the basis of the second image. The refinement further makes possible a simple and fast determination of the calibration data set on the basis of a limited number of image recordings. The calibration object can be a diffusely reflective body which is positioned at one or more positions within the measurement volume. It is advantageous if the bidirectional reflectance distribution function BRDF of the calibration object is known and/or the calibration object reflects uniformly diffusely over its surface. For example, the calibration object can be a ceramic plate or another molded body having a diffusely reflective surface.

In a further refinement, the second measurement arrangement has a housing accommodating the first camera, wherein the light sources are arranged at the housing.

In this refinement, at least some light sources are arranged in a mechanically fixed position relative to the first camera. The refinement has the advantage that the position of these light sources relative to the camera is substantially fixed and therefore independent of any individual placement specified by the user. The second measurement arrangement can therefore be put into operation more simply and faster, and a calibration data set can be used over rather long operating periods, at least with respect to the light sources arranged at the housing. Alternatively or in addition, the second measurement arrangement can have (further) light sources that are positioned separately from the housing. Such a refinement is particularly advantageous for measuring large measurement objects using the novel method and the novel apparatus.

In a further refinement, the first measurement arrangement has a pattern projector and a second camera, which are arranged at a defined position and orientation with respect to one another.

In this refinement, the first measurement arrangement advantageously operates in accordance with a fringe projection method or a similar method, in which suitable patterns are projected onto the measurement object surface and in which the 3D coordinates are determined on the basis of the trigonometric relationship between the pattern projector and the second camera. Such methods allow for fast measurement value recording at a plurality of measurement points. They provide good measurement results even without the correction of the first measurement values explained above, which is why such a first measurement arrangement can be employed highly advantageously in the novel apparatus and with the novel method.

In a further refinement, the first and the second camera are identical.

It is generally possible for the first measurement arrangement and the second measurement arrangement to each use their own cameras. In the refinement preferred here, however, at least one camera forms part of both measurement arrangements. In some exemplary embodiments, the novel apparatus has an individual camera which is both a part of the first measurement arrangement and a part of the second measurement arrangement. Alternatively, other exemplary embodiments of the novel apparatus can include two cameras, one of which is a part of the first and of the second measurement arrangement, while the other camera is merely a part of the first measurement arrangement. The use of two cameras as a part of the first measurement arrangement makes possible an (additional) trigonometric evaluation and may therefore be advantageous for some applications. In general, this refinement has the advantage that the novel method and the novel apparatus can be realized cost-effectively.

In a further refinement, the second camera has a camera resolution and the pattern projector has a projector resolution that is lower than the camera resolution, wherein the first measurement arrangement limits the camera resolution in dependence on the second measurement results.

This refinement helps to measure a measurement object within a measurement volume with optimum resolution. The measurement resolution of the first measurement arrangement is typically limited by the maximum resolution of the pattern projector, because the technical development in cameras is significantly more advanced and has resulted in higher resolutions than in the case of projectors. The resolution of a projected pattern on the measurement object, however, does not depend only on the pattern projector itself, but also on the distance between the pattern projector and the object surface. As a result, the maximally achievable measurement resolution can vary in dependence on the positioning of the measurement object in the measurement volume. With the present implementation, an optimum measurement resolution is advantageously determined and used for an individual measurement task. In some exemplary embodiments, this can be done adaptively, with the result that an optimum measurement resolution is used for each measurement object surface and preferably even for each region of the measurement object surface.

In a further refinement, a projection pattern with which the pattern projector illuminates the measurement object is determined in dependence on measurement values of the second measurement arrangement.

In this refinement, the projection pattern is determined depending on information that is obtained by way of the second measurement arrangement. The novel method and the novel apparatus of this refinement can advantageously avoid unfavorable multiple reflections of the projection pattern at inner edges of the measurement object. Multiple reflections of the projection pattern can unfavorably influence in particular the measurement accuracy of the first measurement arrangement, which is efficiently avoided in this refinement. In some exemplary embodiments, the measurement object is first measured with a "standard projection pattern" with the first measurement arrangement. Next, the second measurement results are determined with the second measurement arrangement using the first measurement results and the calibration data set, which for the reasons explained above already provides an increased measurement accuracy. Following this, the object surface may once again be measured with the first measurement arrangement, wherein this second measurement process is performed with an optimized projection pattern that was selected and/or determined in dependence on the second measurement results. In other exemplary embodiments, the measurement object is first measured with the second measurement arrangement, wherein in this case a conventional photometric stereo method is used to obtain preliminary surface normals. Next, the object surface is measured with the first measurement arrangement, wherein an optimized projection pattern is selected and/or determined in dependence on the preliminary surface normals. Following this, the 3D coordinates from the first measurement arrangement may then advantageously be used in order to determine optimized surface normals with the second measurement arrangement. The second measurement arrangement can advantageously use the camera images of the first measurement process here, that is to say the camera images from the conventional photometric stereo method, because the new determination of the surface normals may take place by way of calculation. With this refinement, a particularly high measurement accuracy is attained. The last-mentioned exemplary embodiments additionally permit a measurement time which is shorter as compared to the first-mentioned exemplary embodiments.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Exemplary embodiments of the invention are illustrated in the drawing and will be explained in greater detail in the following description. In the figures:

FIG. 3 shows a simplified illustration of a camera and projector arrangement with additional light sources for the exemplary embodiment in accordance with FIG. 1, FIG. 4 shows a further exemplary embodiment of the novel apparatus in a schematic illustration.

DESCRIPTION OF PREFERRED EMBODIMENTS

Figure 1:
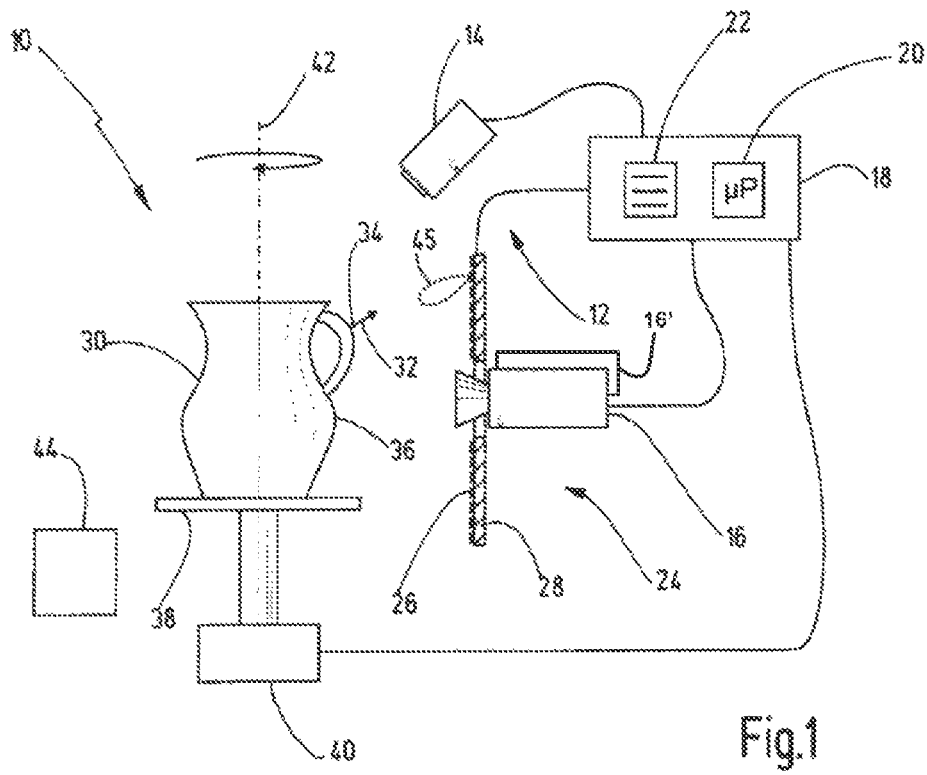
FIG. 1 shows a schematic illustration of a first exemplary embodiment of the novel apparatus.

In FIG. 1, an exemplary embodiment of the novel apparatus is designated by the reference numeral 10. The apparatus 10 has a first measurement arrangement 12, which here includes a projector 14, a camera 16 and an evaluation and control unit 18. The projector 14 and the camera 16 are arranged in a defined and known position and orientation relative to one another. As will be explained below with reference to FIG. 3, the projector 14 and the camera 16 can be arranged in a common device housing to permanently ensure the relative position and orientation. In principle, however, the projector 14 and the camera 16 may be arranged separately, wherein the relative position and orientation in that case has to be determined in situ.

The evaluation and control unit 18 includes a processor 20, which controls the projector 14 and the image recording of the camera 16. The processor 20 furthermore evaluates the images recorded with the camera 16. In some exemplary embodiments, the evaluation and control unit 18 is implemented on a commercially available personal computer. In other exemplary embodiments, the evaluation and control unit 18 with processor 20 can be a special computer which is optimized in particular for fast processing of large image data.

The evaluation and control unit 18 further includes a memory in which a calibration data set 22 is stored. The memory may store further data (not illustrated here), such as in particular an executable computer program which is used to implement exemplary embodiments of the novel method.

The apparatus 10 further includes a second measurement arrangement 24 having a camera and a plurality of light sources 26. In the exemplary embodiment illustrated here, camera 16 is also part of the second measurement arrangement 24. Camera 16 in this exemplary embodiment consequently serves for recording first images that are evaluated in the evaluation and control unit 18 as part of the first measurement arrangement 12. The camera 16 also serves for recording second images that are evaluated in the evaluation and control unit 18 as part of the second measurement arrangement 24. The evaluation and control unit 18 may thus be part of the first measurement arrangement 12 and part of the second measurement arrangement 24. However, it is generally possible for the first measurement arrangement 12 and the second measurement arrangement 24 to be realized with separate components, that is to say in each case its own camera 16,16' and/or its own evaluation and control unit.

The light sources 26 are here illustrated by way of example as LED light sources arranged on an LED panel 28. In the illustrated exemplary embodiment, the LED panel 28 has a central opening through which the camera 16 can take images of a measurement object 30, while the latter is illuminated by one or more light sources 26. In the preferred exemplary embodiments, the second measurement arrangement 24 operates according to the photometric stereo method, as is known in principle from the publications by R. J. Woodham and Nehab et al., mentioned at the outset. These publications are therefore incorporated herein reference.

The second measurement arrangement 24 may include further LED panels (not illustrated here) having further light sources, which are arranged laterally of, above and/or below the measurement object 30. The evaluation and control unit 18 is configured to switch the various light sources 26 on and off in a defined sequence (individually or in defined groups) so as to illuminate the measurement object 30 from different directions. The evaluation and control unit 18 is further configured to record images of the measurement object 30 at the different illuminations using camera 16. The evaluation and control unit 18 is further configured to determine surface normals 32 at a plurality of measurement points 34 at the surface of the measurement object 30 using said images. The surface normals 32 are (imaginary) vectors which are each orthogonal to the measurement object surface at the respective measurement points 34. A plurality of such surface normals 32 consequently represents the profile of the surface and consequently the shape of the measurement object 30.

The first measurement arrangement 12 in this preferred exemplary embodiment operates in accordance with the principle of fringe projection. In principle, however, the first measurement arrangement could operate in accordance with another method that provides 3D coordinates of the object surface.

The projector 14 is used here to project a defined pattern, in particular a stripe pattern, onto the surface of the measurement object 30. The evaluation and control unit 18 is configured to record one or more images of the measurement object 30 including the projected pattern using the camera 16. Since the projector 14 and the camera 16 have a defined and known position and orientation with respect to one another, the evaluation and control unit 18 can determine 3D coordinates of measurement points 36 at the surface of the measurement object 30 on the basis of trigonometric relationships. Instead of a stripe pattern, it is also possible to project other patterns onto the surface of the measurement object 30 using the projector 14, such as squares, dots, individual lines or combinations thereof.

The measurement object 30 is arranged in this exemplary embodiment on a rotary table 38, which can be rotated about an axis 42 by way of a drive 40. This makes possible the automated measurement of the measurement object 30 from several sides. The rotary table is actuated by the evaluation and control unit 18.

A calibration body is illustrated at reference numeral 44. Calibration body 44 is used here in order to determine the calibration data set 22. In the preferred exemplary embodiments, the calibration data set 22 represents the individual direction-dependent radiation patterns 45 of all light sources 26 of the measurement arrangement 24, as will be explained in more detail below with reference to FIG. 2. Moreover, calibration data set 22 may include further calibration data in the preferred exemplary embodiments, such as calibration data that represent the internal calibration (imaging errors such as distortion etc.) and the external calibration of the camera 16 relative to the projector 14. The calibration data set 22 may further include calibration data that represent individual characteristics of the projector 14 and/or of the rotary table 38 with the drive 40. The processor 20 of the evaluation and control unit 18 advantageously uses the data from the calibration data set 22 in order to determine dimensional and/or geometric characteristics of the measurement object 30 in accordance with the novel method.

Figure 2:
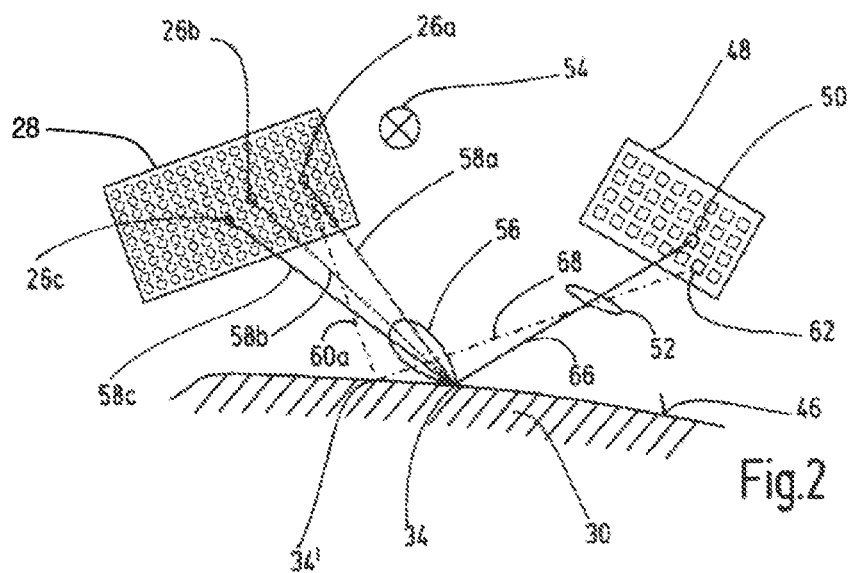
FIG. 2 shows a schematic illustration for explaining the mode of function of the second measurement arrangement in the apparatus of FIG. 1.

FIG. 2 illustrates a section from the surface 46 of the measurement object 30. Instead of the measurement object 30, the section could be from the surface of the calibration object 44, specifically while the apparatus 10 is being calibrated, to determine the calibration data set 22. The image sensor of the camera 16 is illustrated at reference numeral 48. The image sensor 48 has a plurality of camera pixels 50. The camera optical unit of the camera 16 is illustrated in simplified fashion at the reference numeral 52. The camera 16 records light rays that are incident through the camera optical unit 52 and illuminate one or more camera pixels 50 of the image sensor 48.

Furthermore illustrated here schematically is an LED panel 28, which includes a plurality of LEDs 26*a*, 26*b*, 26*c*. In some exemplary embodiments, the LEDs 26*a*, 26*b*, 26*c* may be differently colored LEDs. For example, the LED 26*a* may emit red light, while the LED 26*b* may emit green light and the LED 26*c* may emit blue light. Although LED panels having a plurality of LEDs 26*a*-26*c* are advantageous, other exemplary embodiments may include other types of light sources, such as fluorescent tubes.

Illustrated at reference numeral 54 is here an optional white light source 54, which may advantageously be used during calibration of the apparatus 10 in order to normalize the differently colored light sources.

As can be seen in FIG. 2, the individual LEDs 26*a*-26*c* each generate one or more light ray(s) 58*a*, 58*b*, 58*c*, which is reflected at surface 46 to be incident on the camera pixel 50. Which light rays of the light sources 26 reach which camera pixels 50 by way of a reflection at the surface 46 depends, among other things, on the reflective characteristics of the surface 64, which is illustrated here by way of a radiation lobe 56 at the measurement point 34. The radiation lobe 56 represents the BRDF of the object surface at the measuring point 34. Illustrated by way of example is a further light ray 60*a* from the LED 26*a*, which illuminates a different camera pixel 62 by a further reflection at a different measurement point 34' of the surface 46.

Which light sources 26 illuminate which camera pixels 50, 62 and how strongly over the surface 46 depends on the radiation pattern 45 of the respective light source 26 and in addition on the local inclination of the surface 46 at the measurement points. Depending on the radiation pattern 45, the local inclination of the surface 46 and the alignment of the light sources 26, different light rays or light vectors 58*a*, 58*b*, 58*c* (and consequently 66, 68) are produced, which illuminate the camera pixels 50, 62 of the camera 16. Using a known calibration object 44, it is possible to determine the individual radiation patterns 45 of the light source 26 and the light vectors 58*a*, 58*b*, 58*c* which are produced for a known position of the object surface 46. On this basis, the novel method and the novel apparatus use a calibration data set 22 which represents the individual radiation patterns 45 of the light sources 26 and preferably the individual light vectors 58*a*, 58*b*, 58*c* of the individual light sources 26 for a known surface 46. Using the 3D coordinates of a measurement object 30, which are determined with the first measurement arrangement 12, it is then advantageously possible to take account of the individual light vectors 58*a*, 58*b*, 58*c* during the evaluation of the images by the second measurement arrangement 24.

FIG. 3 shows camera 16 in a preferred exemplary embodiment in a view from the front. In this exemplary embodiment, camera 16 has a camera housing 72 accommodating both the projector 14 and the camera 16 with the camera optical unit 52. In this exemplary embodiment, a plurality of LEDs 26*a*, 26*b* are arranged at the camera housing 72. For example, the LEDs 26*a*, 26*b* are arranged here in the region of the camera optical unit 52. In some exemplary embodiments, a plurality of LEDs 26*a*, 26*b* may surround the camera optical unit 52. In principle, LEDs 26 and/or other light sources can be arranged in another way at the camera housing 72 or at a retainer that is mechanically coupled to the camera housing 72.

In the situation illustrated in FIG. 3, the projector 14 produces a stripe pattern 74, which is reflected by surface 46 of the measurement object 30 to camera 16. Camera 16 consequently records an image of the surface 46 of measurement object 30 with projected stripe pattern 74. Due to the known trigonometric relationships between projector 14 and camera 16, the evaluation and control unit 18 can determine 3D coordinates to measurement points 36 at the surface 46.

FIG. 4 shows a further exemplary embodiment of the apparatus, designated here with the reference numeral 10'. Identical reference signs designate the same elements as before.

In this exemplary embodiment, light sources 26 are arranged on two arms 78, 80. The arm 78 is rotatably mounted at a distance d1 from the central axis of the workpiece table 38, which can be rotatable or fixed. The arm 80 is arranged at a distance d2 and is likewise rotatable. Consequently, the arms 78, 80 can be rotated about the axis 42, which is indicated by the arrow 82. The light sources 26 can be moved to different positions around the measurement object 30 using the arms 78, 80 and illuminate the measurement object. The respectively current position of the arms 78, 80 is set by the evaluation and control unit 18 using a suitable drive (not illustrated here). In a modification, the apparatus 10' may have a single arm 78 with light sources 26. As for the rest, the apparatus 10' may operate in the same way as the apparatus 10.

Figure 5:
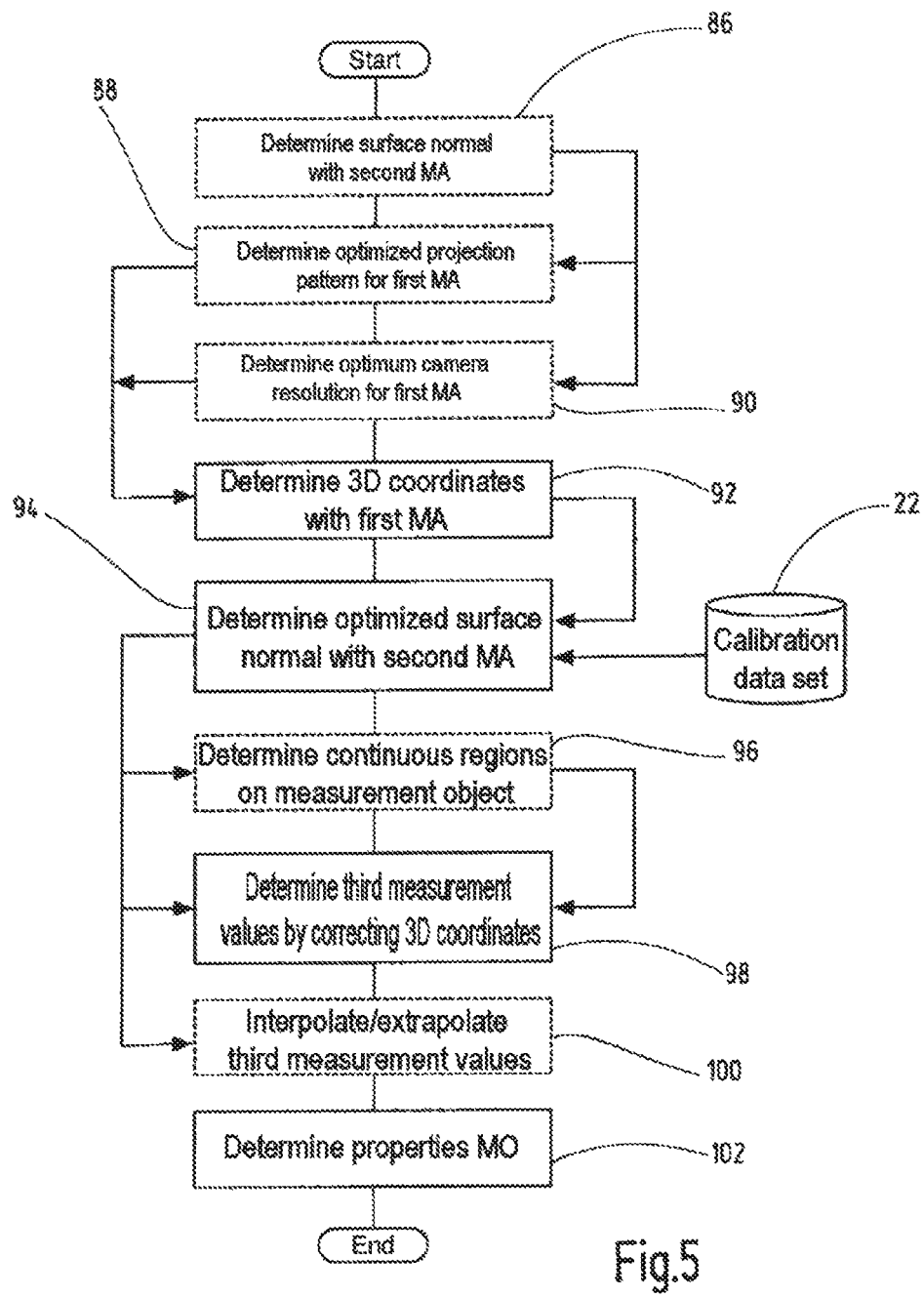
FIG. 5 shows a flowchart for explaining an exemplary embodiment of the novel method.

An exemplary embodiment of the novel method will be explained below with reference to FIG. 5. In a first step 86, provisional surface normals 32 at selected measurement points 34 of the measurement object 30 are determined using the second measurement arrangement 24 (in short MA) by way of a conventional photometric stereo method. In step 88, an optimized projection pattern for a measurement with the first measurement arrangement 12 is selected such that multiple reflections at inner edges of the measurement object 30 are avoided as far as possible. Problematic inner edges that produce multiple reflection of the projection pattern may advantageously be identified on the basis of the provisional surface normals 32. Accordingly, data or information determined in step 86 are/is advantageously used in step 88, which is indicated by the arrows.

By way of example, the projection pattern can be divided into partial patterns that each illuminate only individual surface regions at which no multiple reflection or weakened multiple reflection occurs. Parts of the projection pattern may be masked and/or weakened in dependence on the information from step 86. In some exemplary embodiments, a series of partial patterns is determined in step 88, which are projected successively onto the surface of the measurement object 30.

In step 90, an optimum camera resolution for the first measurement arrangement 12 with respect to the concrete measurement object 30 is determined using the information/data from step 86. The steps 86 to 90 are optional, which is indicated here by way of dashed boxes.

In step 92, optimized 3D coordinates at selected measurement points 36 of the measurement object 30 are determined using the first measurement arrangement 12. The first measurement arrangement 12 here advantageously operates in accordance with the fringe projection method which is known per se. Here, the optimized projection patterns from step 88 and an optimum camera resolution in accordance with step 90 are preferably used, which is indicated by arrows.

In step 94, optimized surface normals are then determined with the second measurement arrangement 24. In principle, the second measurement arrangement 24 operates in step 94 exactly as in step 86. However, in step 94, the optimized 3D coordinates from step 92 and the data from the calibration data set 22 are used to first determine individual light vectors 58a, 58b, 58c and to determine, on that basis, the optimized surface normals 32. In preferred exemplary embodiments, the second measurement arrangement 24 in step 94 uses the original camera images from step 86, i.e. a new image recording can be dispensed with.

In step 96, continuous regions of the measurement object surface are determined on the basis of a threshold value criterion for the optimized surface normals. Sharp edges and corners of the measurement object 30 are identified in this way and "excluded" from the continuous regions.

In step 98, third measurement values are determined by correcting the 3D coordinates from step 92 on the basis of the surface normals from step 94. The correction in step 98 can include minimizing the error squares or another correction criterion for reconciling the 3D coordinates that were determined with the first measurement arrangement 12 and the optimized surface normals that were determined with the second measurement arrangement 24. In some exemplary embodiments, it is possible to calculate from the surface normals from step 94 3D coordinates which are reconciled with the 3D coordinates from step 92 in accordance with the method of least squares or with another compensation method.

In step 100, the third measurement values from step 98 are supplemented by interpolation and/or extrapolation, wherein the optimized surface normals 32 from step 94 are also advantageously used in this step. Finally, in step 102, characteristics of the measurement object are determined in a known manner, specifically on the basis of the third measurement values from step 100 and/or on the basis of the optimized measurement values from step 94.

In summary, the novel apparatus and the novel method consequently use a calibration data set 22 that represents the direction-dependent radiation patterns 45 of the light sources 26 used in the second measurement arrangement 24. On this basis, and on the basis of the 3D coordinates of the measurement object 30 from the first measurement arrangement 12, the surface normals 32 are determined. The resulting higher accuracy of the second measurement arrangement 24 is advantageously used to obtain overall a higher measurement accuracy during the determination of dimensional and/or geometric characteristics of the measurement object.

What is claimed is:

1. A method for determining at least one of dimensional or geometric characteristics of a measurement object, comprising the steps of:
providing a first measurement arrangement for determining 3D coordinates at first selected measurement points of the measurement object,
providing a second measurement arrangement for determining surface normals at second selected measurement points of the measurement object, wherein the second measurement arrangement includes a number of light sources and a first camera which is directed to the measurement object,
providing a calibration data set representing direction dependent individual radiation patterns of the light sources,
determining 3D coordinates at the first selected measurement points using the first measurement arrangement, the 3D coordinates defining first measurement results,
determining surface normals at the second selected measurement points using the second measurement arrangement and using the calibration data set and the first measurement results, the surface normals thus determined defining second measurement results, and
determining the at least one of dimensional or geometric characteristics of the measurement object using the first and the second measurement results.

2. The method of claim 1, wherein the first measurement results are corrected using the second measurement results in order to obtain third measurement results, and the at least one of dimensional or geometric characteristics of the measurement object are determined using at least one of the second or the third measurement results.

3. The method of claim 2, further comprising a step of determining continuous regions of the measurement object using the second measurement results, with the first measurement results being corrected using the second measurement results in the continuous regions only.

4. The method of claim 2, comprising a step of interpolating the first measurement results using the second measurement results, with the at least one of dimensional or geometric characteristics of the measurement object being determined using the interpolated first measurement results.

5. The method of claim 2, comprising a step of extrapolating the first measurement results using the second measurement results, with the at least one of dimensional or geometric characteristics of the measurement object being determined using the extrapolated first measurement results.

6. The method of claim 1, further comprising a step of determining a respective individual light vector between a respective light source from the number of light sources and one of the second measurement points using the first measurement values and the calibration data set, with the second measurement results being determined using the respective individual light vectors.

7. The method of claim 6, wherein the number of light sources comprises a first and at least one second light source, wherein the respective individual light vectors are determined separately for the first and for the at least one second light source.

8. The method of claim 7, further comprising a step of normalizing the individual radiation patterns of the first and of the at least one second light source using the respective individual light vectors.

9. The method of claim 1, wherein the second measurement arrangement has a plurality of differently colored light sources.

10. The method of claim 9, further comprising a step of capturing a first image and a second image of a calibration object with the camera, wherein the calibration object is illuminated with the differently colored light sources in the first image, and wherein the calibration object is illuminated with white light in the second image.

11. The method of claim 1, wherein the second measurement arrangement has a housing accommodating the first camera, with the number of light sources being arranged at the housing.

12. The method of claim 1, wherein the first measurement arrangement has a pattern projector and a second camera, which are arranged at a defined position and orientation with respect to one another.

13. The method of claim 12, wherein the second camera has a camera resolution and the pattern projector has a projector resolution that is lower than the camera resolution, and wherein the first measurement arrangement limits the camera resolution in dependence on the second measurement results.

14. The method of claim 1, wherein the first measurement arrangement has a pattern projector arranged at a defined position and orientation with respect to the first camera, with the first camera forming part of the first measurement arrangement and of the second measurement arrangement.

15. The method of claim 1, further comprising a step of determining a projection pattern, with which the pattern projector illuminates the measurement object, in dependence on measurement values from the second measurement arrangement.

16. A measuring apparatus for determining at least one of dimensional or geometric characteristics of a measurement object, comprising:

a first measurement arrangement for determining 3D coordinates at first selected measurement points of the measurement object, a second measurement arrangement for determining surface normals at second selected measurement points of the measurement object, wherein the second measurement arrangement includes a number of light sources and a first camera which is directed to the measurement object, and an evaluation and control unit comprising a calibration data set that represents individual direction dependent radiation patterns of the light sources and a computer processor configured for— determining the 3D coordinates at the first selected measurement points using the first measurement arrangement, the 3D coordinates defining first measurement results, determining the surface normals at the second selected measurement points using the second measurement arrangement and using the calibration data set and the first measurement results, the surface normals thus determined defining second measurement results, determining the at least one of dimensional or geometric characteristics of the measurement object using the first and second measurement results.

17. A computer program product comprising program code stored on a non-transitory storage medium, the program code configured to execute a method for determining at least one of dimensional or geometric characteristics of a measurement object using a first measurement arrangement for determining 3D coordinates at first selected measurement points of the measurement object and using a second measurement arrangement for determining surface normals at second selected measurement points of the measurement object, wherein the second measurement arrangement includes a number of light sources and a first camera which is directed to the measurement object, the method comprising the steps of:

providing a calibration data set representing individual radiation patterns of the light sources, determining 3D coordinates at the first selected measurement points using the first measurement arrangement, the 3D coordinates defining first measurement results, determining surface normals at the second selected measurement points using the second measurement arrangement and using the calibration data set and the first measurement results, the surface normals thus determined defining second measurement results, and determining the at least one of dimensional or geometric characteristics of the measurement object using the first and the second measurement results.

* * * * *